(12) United States Patent
Schechter et al.

(10) Patent No.: US 12,421,111 B2
(45) Date of Patent: Sep. 23, 2025

(54) GAS PRODUCTION DEVICE AND METHOD

(71) Applicant: ARIEL SCIENTIFIC INNOVATIONS LTD., Ariel (IL)

(72) Inventors: Alex Schechter, Givat Koah (IL); Idit Avrahami, Rosh Haayin (IL)

(73) Assignee: ARIEL SCIENTIFIC INNOVATIONS LTD., Ariel (IL)

( * ) Notice: Subject to any disclaimer, the term of this patent is extended or adjusted under 35 U.S.C. 154(b) by 896 days.

(21) Appl. No.: 17/292,439

(22) PCT Filed: Nov. 7, 2019

(86) PCT No.: PCT/IL2019/051218
§ 371 (c)(1),
(2) Date: May 9, 2021

(87) PCT Pub. No.: WO2020/095304
PCT Pub. Date: May 14, 2020

(65) Prior Publication Data
US 2021/0371276 A1  Dec. 2, 2021

(30) Foreign Application Priority Data

Nov. 8, 2018 (IL) .......................................... 262900

(51) Int. Cl.
*C01B 3/06* (2006.01)
*B01J 7/00* (2006.01)
*H01M 8/065* (2016.01)

(52) U.S. Cl.
CPC ................. *C01B 3/065* (2013.01); *B01J 7/00* (2013.01); *H01M 8/065* (2013.01)

(58) Field of Classification Search
CPC .................................. C01B 3/065; B01J 7/02
See application file for complete search history.

(56) References Cited

U.S. PATENT DOCUMENTS 5,593,640 A * 1/1997 Long .......................... B01J 7/02
422/111
7,594,939 B2 * 9/2009 Goldstein ............. H01M 8/065
422/198

(Continued)

OTHER PUBLICATIONS

Demirci, U.B. & Akdim, O. & Miele, Philippe. (2009). Ten-year efforts and a no-go recommendation for sodium borohydride for on-board automotive hydrogen storage. International Journal of Hydrogen Energy—Int J Hydrogen Energ. 34. 2638-2645. 10.1016/j.ijhydene.2009.01.038.

(Continued)

*Primary Examiner* — Imran Akram
(74) *Attorney, Agent, or Firm* — The Roy Gross Law Firm, LLC; Roy D. Gross

(57) ABSTRACT

A system including a gas production device including (a) a solid containing compartment configured to contain a solid, (b) at least one fluid channel with an inlet and an outlet comprising an opening along at least a portion of its length, the opening facing the solid, (c) a solution compartment configured to contain a solution, the solution compartment: (1) being in fluid communication with the fluid channel inlet and outlet, (2) located along a fluid pathway in between the fluid channel outlet and inlet, and (3) at least one hydrogen gas outlet, (d) a fluid flow driver in fluid communication with the fluid pathway, and (e) a fluid flow rate regulator connected to the fluid flow driver. Disclosed is also a method for producing a gas (e.g., hydrogen).

15 Claims, 9 Drawing Sheets

(56) References Cited

U.S. PATENT DOCUMENTS

| | | | |
|---|---|---|---|
| 2003/0194368 A1 | 10/2003 | Devos et al. | |
| 2004/0052722 A1 | 3/2004 | Jorgensen et al. | |
| 2004/0148857 A1* | 8/2004 | Strizki | C01B 3/065 48/128 |
| 2004/0214056 A1* | 10/2004 | Gore | C01B 3/065 422/198 |
| 2005/0238573 A1 | 10/2005 | Zhang et al. | |
| 2005/0276748 A1* | 12/2005 | Morioka | H01M 8/065 429/57 |
| 2006/0042162 A1 | 3/2006 | Goldstein et al. | |
| 2006/0147776 A1* | 7/2006 | Sarata | H01M 8/065 429/444 |
| 2006/0269470 A1 | 11/2006 | Zhang et al. | |
| 2007/0020172 A1 | 1/2007 | Withers-Kirby et al. | |
| 2007/0037034 A1* | 2/2007 | Fisher | A61F 7/007 429/421 |
| 2009/0324452 A1 | 12/2009 | Salinas et al. | |
| 2010/0233077 A1 | 9/2010 | Ku et al. | |
| 2012/0148453 A1* | 6/2012 | Rosenzweig | H01M 8/04208 422/112 |
| 2013/0230784 A1* | 9/2013 | Wallace | H01M 8/065 429/421 |

OTHER PUBLICATIONS

Schlesinger, H., et al., Sodium borohydride, its hydrolysis and its use as a reducing agent and in the generation of hydrogen1. Journal of the American Chemical Society, 1953. 75(1): p. 215-219.

Santos, D. and C. Sequeira, Sodium borohydride as a fuel for the future. Renewable and Sustainable Energy Reviews, 2011. 15(8): p. 3980-4001.

Merino-Jiménez, I., De León, C. P., Shah, A. A., & Walsh, F. C. (2012). Developments in direct borohydride fuel cells and remaining challenges. Journal of Power Sources, 219, 339-357.

Nagar, Y., et al., Modeling the mechanical behavior of sodium borohydride (NaBH4) powder. Materials & Design, 2016. 108: p. 240-249.

Wu, Y. & Millennium Cell Inc. (Apr. 14-15, 2003). Hydrogen Storage via Sodium Borohydride Current Status, Barriers, and R&D Roadmap [Presentation]. GCEP—Stanford University Global Climate & Energy Project, Stanford, California.

Zhang, Q., et al., Catalytic hydrolysis of sodium borohydride in an auto-thermal fixed-bed reactor. International journal of hydrogen energy, 2006. 31(7): p. 961-965.

Gislon, P. & Monteleone, G. & Prosini, Pier Paolo. (2009). Hydrogen production from solid sodium borohydride. International Journal of Hydrogen Energy—Int J Hydrogen Energ. 34. 929-937. 10.1016/j.ijhydene.2008.09.105.

Muir, Sean & Yao, X.. (2011). Progress in sodium borohydride as hydrogen storage material: Development of hydrolysis catalysts and reaction systems. International Journal of Hydrogen Energy. 36. 5983-5997. 10.1016/j.jhydene.2011.02.032.

Liang, Y., et al., Hydrogen generation from sodium borohydride solution using a ruthenium supported on graphite catalyst. international journal of hydrogen energy, 2010. 35(7): p. 3023-3028. 10.1016/j.ijhydene.2009.07.008.

Amendola, S.C., et al., An ultrasafe hydrogen generator: aqueous, alkaline borohydride solutions and Ru catalyst. Journal of Power Sources, 2000. 85(2): p. 186-189.

Zolotih, M. (2017). Pump Based Hydrogen Generator. Ariel University.

PCT International Search Report for International Application No. PCT/IL2019/051218, mailed Feb. 13, 2020, 5pp.

PCT Written Opinion for International Application No. PCT/IL2019/051218, mailed Feb. 13, 2020, 5pp.

* cited by examiner

GAS PRODUCTION DEVICE AND METHOD

CROSS REFERENCE TO RELATED APPLICATIONS

This application is a National Phase of PCT Patent Application No. PCT/IL2019/051218 having International filing date of Nov. 7, 2019, which claims the benefit of priority of IL Patent Application No. 262900 titled "SYSTEM, DEVICE AND METHOD FOR HYDROGEN PRODUCTION", filed Nov. 8, 2018. The contents of the above applications are all incorporated by reference as if fully set forth herein in their entirety.

FIELD OF THE INVENTION

The present invention in some embodiments thereof relates to hydrogen production and, more particularly, but not exclusively, relates to a system, device and method for controlled hydrogen production.

BACKGROUND OF THE INVENTION

Electrical batteries are the most commonly used energy storage devices for portable uses (e.g., for small electrical and/or electronic devices, mobile phones and cars). An alternative for batteries is a fuel cell that produces electrical power from supplied fuel, e.g. hydrogen. Hydrogen can be stored and carried by using tanks, however due to its high volatility and inflammability, energy density of full hydrogen tanks is relatively low.

SUMMARY OF THE INVENTION

According to an aspect of some embodiments of the invention there is provided a gas production device including a solid containing compartment configured to contain a solid, at least one fluid channel with an inlet and an outlet including an opening along at least a portion of its length, the opening facing the solid, a solution compartment configured to contain a solution, the solution compartment being in fluid communication with the fluid channel outlet and inlet, and located along a fluid pathway in between the fluid channel outlet and inlet, and at least one gas outlet. In some embodiments, the gas is hydrogen.

According to some embodiments, the device includes a fluid flow driver in fluid communication with the fluid pathway, wherein the fluid flow driver is selected from a pump, a pressure differentiator, a gravitational apparatus.

According to some embodiments, the device includes a fluid flow rate regulator connected to the fluid flow driver wherein the fluid flow rate regulator is selected from a processor, a valve, a pump, or any combination thereof. According to some embodiments, the device includes at least one partition disposed between an exposed portion of the solid and the fluid channel opening. In some embodiments, the solid containing compartment includes an actuator configured to apply pressure in at least a portion of the solid urging the solid towards the partition, so that at least a portion of the solid is continuously in contact with at least a portion of the partition. In some embodiments, the pressure is controlled.

According to some embodiments, the solid includes a metal hydride. In some embodiments, the metal hydride includes at least one borohydride salt of formula $M(BH_4)_n$, wherein M is selected from the group consisting of alkali metal cations, alkaline earth metal cations, aluminum cation, zinc cation, and ammonium cation, and n corresponds to the charge of the selected M cation. In some embodiments, the metal hydride includes $NaBH_4$. In some embodiments, the solid includes a catalyst.

According to some embodiments, the gas production device of any one of claim 1, wherein the solution is an aqueous solution. In some embodiments, the solution includes a catalyst. In some embodiments, the solution compartment includes an outlet bellow the solution surface level. In some embodiments, the solution compartment includes an outlet above the solution surface level.

According to an aspect of some embodiments of the invention there is provided a system including a gas production device including: a solid containing compartment configured to contain a solid, at least one fluid channel with an inlet and an outlet including an opening along at least a portion of its length, the opening facing the solid, a solution compartment configured to contain a solution, the solution compartment being in fluid communication with the fluid channel inlet and outlet, and located along a fluid pathway in between the fluid channel outlet and inlet, and at least one gas outlet.

According to some embodiments, the fluid flow driver is in fluid communication with the fluid pathway, and a fluid flow rate regulator connected to the fluid flow driver. In some embodiments, the fluid flow driver is selected from a pump, a pressure differentiator, a gravitational apparatus. In some embodiments, the fluid flow rate regulator is selected from a processor, a valve, a pump, or any combination thereof. In some embodiments, the solution compartment includes a mixing element. In some embodiments, the system includes a heating element. In some embodiments, the system includes a cooling element. In some embodiments, the system includes an insulation element. In some embodiments, the system heating element, cooling element and/or insulation element are located in the solution compartment. In some embodiments, the solid containing compartment contains a metal hydride.

According to some embodiments, the solid containing compartment includes an actuator configured to apply pressure in at least a portion of the solid urging the solid towards the partition, so that at least a portion of the solid is continuously in contact with at least a portion of the partition. In some embodiments, the processor is configured to calculate solution resistance, solution level, temperature, flow, pressure, or any combination thereof. In some embodiments, the processor is configured to control temperature, power, flow rate, pressure, or any combination thereof. In some embodiments, the processor is configured to control flow rate in at least the fluid pathway or the fluid channel, pressure, the regulator, the actuator, or any combination thereof.

According to some embodiments, the temperature includes solution temperature, solution compartment temperature, solid containing compartment temperature, fluid pathway temperature, fluid channel temperature, or any combination thereof. In some embodiments, the pressure includes solution compartment pressure, solid containing compartment pressure, fluid pathway pressure, fluid channel pressure, or any combination thereof. In some embodiments, the regulator is configured to control the rate of gas generation. In some embodiments, the rate of gas generation is in the range of 1 ml/min to 500 l/min. In some embodiments, the system includes a gas collector.

According to an aspect of some embodiments of the invention there is provided a method for producing gas at a controlled rate including bringing into contact a solid including a metal hydride, and a solution configured to generate gas upon contact with metal hydride, controlling the flow of the solution in contact with the solid, and regulating the flow rate of the solution, thereby controlling the rate of gas produced.

In some embodiments, the flow is continuous, pulsed or both. In some embodiments, the regulating the flow rate of the solution in respect to a contact surface area between the solid and the solution. In some embodiments, the solution is an aqueous solution. In some embodiments, the solution includes a catalyst. In some embodiments, the gas comprises hydrogen and the metal hydride includes at least one borohydride salt of formula $M(BH_4)_n$, wherein M is selected from the group consisting of alkali metal cations, alkaline earth metal cations, aluminum cation, zinc cation, and ammonium cation, and n corresponds to the charge of the selected M cation. In some embodiments, the metal hydride includes $NaBH_4$.

According to an aspect of some embodiments of the invention there is provided a method for controlling hydrogen production using a hydrogen production device as disclosed elsewhere herein the method including: providing a solid including a metal hydride to the device, dissolving at least a portion of the solid in a solution configured to generate hydrogen upon contact with metal hydride, and transporting the solution containing the dissolved solid, to the solution compartment, thereby producing hydrogen. In some embodiments, the solution is an aqueous solution. In some embodiments, the solution includes a catalyst. In some embodiments, the solid includes a catalyst.

According to some embodiments, the metal hydride includes at least one borohydride salt of formula $M(BH_4)_n$, wherein M is selected from the group consisting of alkali metal cations, alkaline earth metal cations, aluminum cation, zinc cation, and ammonium cation, and n corresponds to the charge of the selected M cation. In some embodiments, the metal hydride includes $NaBH_4$. In some embodiments, the method includes generating from 0.05 g to 2 g of hydrogen per 1 g of $NaBH_4$.

In some embodiments, controlling includes stopping the process at any given time.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION OF THE INVENTION

Figure 1:
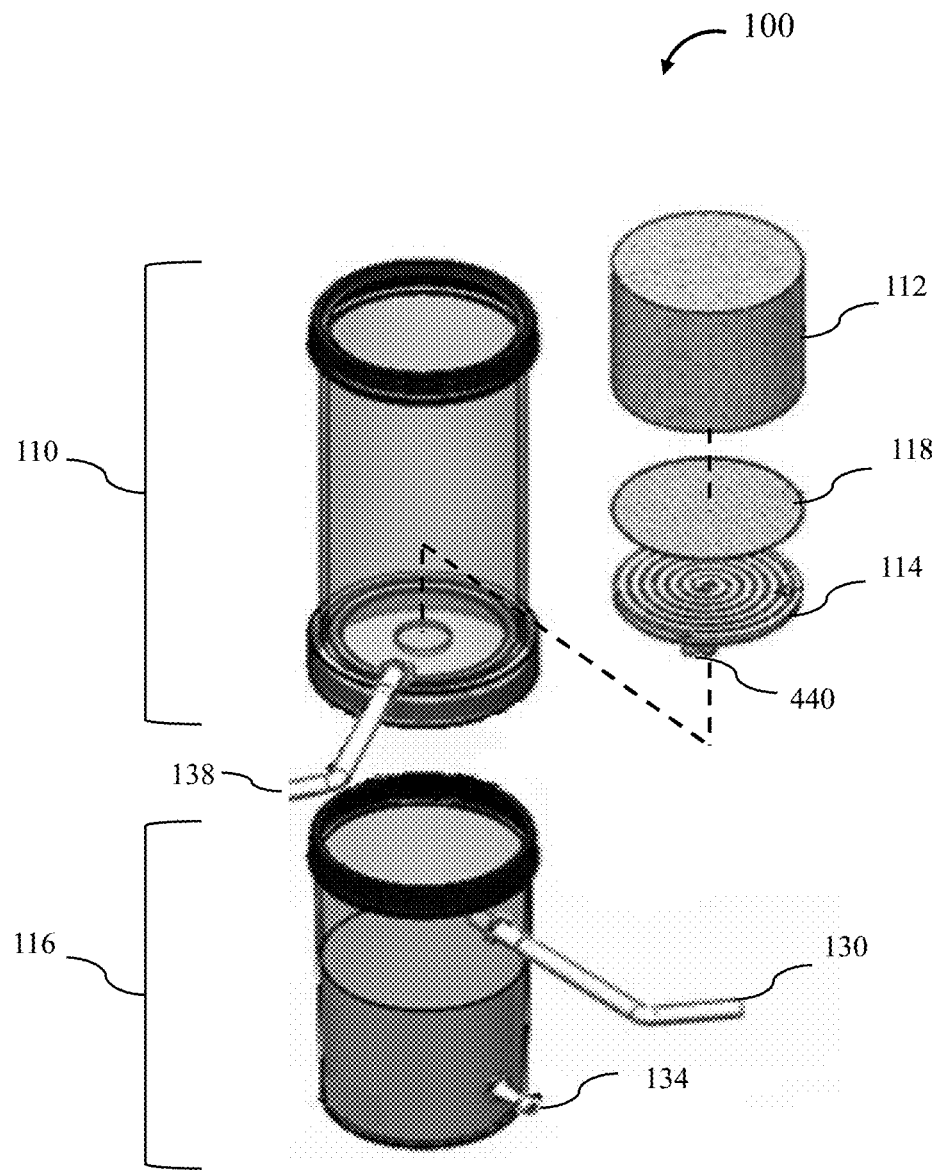
FIG. 1 is an exploded view simplified illustration of some of the components of a gas production device, according to some embodiments of the present invention.

According to an aspect of some embodiments of the present invention there is provided a gas production device. In some embodiments the gas comprises hydrogen.

For purposes of clarity of explanation, from this point forth hydrogen gas is used as an exemplary gas produced by the gas production device disclosed herein. However, the device and method disclosed herein may be used to produce other gases as well.

In some embodiments, hydrogen is produced by contacting a solid with a solution. In some embodiments, hydrogen is produced by partially solubilizing a solid in a solution. In some embodiments, solubilizing a solid in a solution results in a chemical reaction described elsewhere herein, thereby producing hydrogen. In some embodiments, the hydrogen production device is configured to regulate the production of hydrogen. In some embodiments, the hydrogen production device is configured to control the amount of hydrogen generated by controlling the contact surface area between a solid and a solution. In some embodiments, the hydrogen production device controls the production rate of hydrogen by controlling the amount of a solution absorbed in a solid. In some embodiments, the hydrogen production device controls the production rate of hydrogen by controlling the amount of a solid solubilized in a solution.

In some embodiments, contact surface area between the solid and the solution is proportional to the size of a fluid channel, configured to allow fluid communication between a portion of the solid volume and the solution compartment. In some embodiments, contact surface area between a solid and a solution is determined by the shape of a fluid channel. In some embodiments, the hydrogen production device controls the production rate of hydrogen by controlling the rate of flow of the solution in contact with the solid. In some embodiments, the hydrogen production device controls the production rate of hydrogen by controlling the rate of flow in contact with the solid in respect to the contact surface area between a solid and a solution. In some embodiments, the hydrogen production device controls the production of hydrogen by controlling the mixing of a portion of the solid volume and the solution. In some embodiments, the solution flow is continuous. In some embodiments, the solution flow is pulsed.

In some embodiments, the solid comprises a metal hydride. In some embodiments, the solid comprises a catalyst.

In some embodiments, the hydrogen production device comprises a solid containing compartment configured to contain a solid, at least one fluid channel with an inlet and an outlet comprising an opening along at least a portion of its length, the opening facing the solid and a solution compartment configured to contain a solution. In some embodiments, the solution compartment is in fluid communication with the fluid channel inlet and outlet. In some embodiments, the fluid channel comprises a one-way valve to ensure that the fluid flow is directed in one way only. In some embodiments, the hydrogen production device comprises a processor which controls the mixing of a solid and a solution by controlling the fluid circulation between the fluid channel and the solution compartment. In some embodiments, the solution compartment is located along a fluid pathway in between the fluid channel outlet and inlet.

According to an aspect of some embodiments of the present invention, there is provided a hydrogen production device. In some embodiments, the hydrogen production device comprises a fluid flow driver. In some embodiments, the fluid flow driver is in fluid communication with a fluid pathway. In some embodiments, the hydrogen production device comprises a fluid flow rate regulator. In some embodiments, the fluid flow rate regulator is connected to the fluid flow driver. In some embodiments, the fluid flow rate regulator is connected to a processor which controls the solution flow rate. In some embodiments, the fluid flow driver is one or more of a pump, a pressure differentiator, and a gravitational apparatus. In some embodiments, the fluid flow rate regulator is selected from one or more of a processor, a valve, and a pump, or any combination thereof.

In some embodiments, the fluid channel is located between the solid containing compartment and the solution compartment. In some embodiments, the fluid channel comprises an opening along at least a portion of its length. In some embodiments, the fluid channel opening faces the solid. In some embodiments, the area of the opening is determined according to the desired contact area between the solid and the solution. In some embodiments, the surface area of the opening is determined by the length and the width of the fluid channel. In some embodiments, the fluid channel is one or more of a curved channel, a zig-zag, a spiral, or any other geometry, or any combination thereof. In some embodiments, the length of the fluid channel is a spiral with predetermined number of turns. In some embodiments, the number of turns is predetermined according to a desired ratio of the contact surface of the solid to the surface area of the solution.

According to an aspect of some embodiments of the present invention, there is provided a system for producing hydrogen at a controlled rate. In some embodiments, the system comprises a hydrogen production device. In some embodiments the production device comprises a solid containing compartment configured to contain a solid volume, at least one fluid channel with an inlet and an outlet comprising an opening along at least a portion of its length facing the solid containing compartment and a solution compartment configured to contain a solution. In some embodiments, the solution compartment is in fluid communication with the fluid channel inlet and outlet. In some embodiments, the hydrogen production device is connected to a processor which controls the rate dissolution of a solid in a solution by fluid circulation between the fluid channel and the solution compartment. In some embodiments, the hydrogen production device is connected to a processor which controls the mixing of a solid and a solution by fluid circulation between the fluid channel and the solution compartment. In some embodiments the system comprises a fluid flow driver in fluid communication with a fluid pathway. In some embodiments the system comprises a fluid flow rate regulator connected to a fluid flow driver. In some embodiments, the fluid flow driver is one or more of a pump, a pressure differentiator, and a gravitational apparatus. In some embodiments, the fluid flow rate regulator is one or more of a processor, a valve, and a pump, or any combination thereof. In some embodiments, the pressure differentiator detects the differential pressure of two or more of the fluid pathways, fluid channel, solid compartment, solution compartment, and hydrogen outlet. In some embodiments, the valve is a one-way valve which ensures that the fluid flow is directed in one way only. The one-way valve is a safety feature which prevents inadvertent backflow.

In some embodiments, the fluid channel is located between the solid containing compartment and the solution compartment. In some embodiments, the fluid channel comprises an opening along at least a portion of its length. In some embodiments, the fluid channel comprises an opening along at least a portion of its length facing the solid. In some embodiments, the surface area of the opening is predetermined according to a ratio of contact surface of the solid and the solution. In some embodiments, the system comprises a processor. In some embodiments, the processor controls fluid flow from the solution compartment into the fluid pathway. In some embodiments, the processor controls the fluid flow communication between the solution compartment and the fluid channel. In some embodiments, the processor communicates with a fluid flow regulator. In some embodiments, the processor communicates with a fluid flow driver. In some embodiments, the processor controls a fluid flow regulator. In some embodiments, the processor controls a fluid flow driver. In some embodiments, the processor controls the flow rate in response to hydrogen production demand, changes in solution flow rate, changes in hydrogen flow rate, changes in solution concentration inside the solution compartment, signals e.g., voltage gradient, electrical pulses, received from a hydrogen client, e.g., fuel cell, hydrogen battery, changes in hydrogen pressure in one or more of the solution chamber, fluid channel, and hydrogen outlet, changes in temperature in one or more of the solution chamber, fluid channel, and hydrogen outlet, or any combination thereof.

In some embodiments, the hydrogen production device produces hydrogen at a constant flow rate. In some embodiments, the hydrogen production device produces hydrogen on demand. In some embodiments, the hydrogen production device produces hydrogen at a rate of at least 50 ml/min.

According to an aspect of some embodiments of the present invention, there is provided a method for producing hydrogen. In some embodiments, the method comprises contacting a portion of a solid volume with a solution. In some embodiments the solution flow is continuous. In some embodiments, the solution flow is pulsed. In some embodiments, the method comprises producing hydrogen at a rate that is determined by the flow rate of the solution. In some embodiments, the method comprises controlling the production of hydrogen by controlling the flow rate of the solution using a processor. In some embodiments, the method comprises producing hydrogen at a rate determined by the volume of solution absorbed in the solid. In some embodiments, the method comprises controlling the production of hydrogen by controlling the volume of solution absorbed in the solid using a processor. In some embodiments, the method comprises producing hydrogen at a rate determined by the solution concentration. In some embodiments, the method comprises controlling the production of hydrogen by controlling the solution concentration using a processor. In some embodiments, the method comprises producing hydrogen at a rate determined by the solution saturation. In some embodiments, the method comprises controlling the production of hydrogen by controlling the solution concentration using a processor.

In some embodiments, hydrogen is produced at a rate determined by controlling the temperature or the pressure, or a combination thereof, within one or more of the solution compartments, fluid channel, fluid pathway, flow regulator, flow driver, and hydrogen outlet. In some embodiments, hydrogen is produced at a rate determined by the contact surface area of the solid and the solution. In some embodiments, the contact surface area of the solid and the solution is controlled using a processor and a flow regulator/driver. In some embodiments, hydrogen is produced at a rate determined by the ratio between the flow rate of the solution and the contact surface area of the solution and the solid. In some embodiments, the ratio of the flow rate of the solution to the contact surface are of the solution and the solid is controlled using a processor and a flow regulator/driver. In some embodiments, the method comprises determining the ratio between the flow rate of the solution and the contact surface of the solid and the solution. In some embodiments, the method comprises determining the volume of solvent absorbed in the solid. In some embodiments, the solid comprises a metal hydride. In some embodiments, the solid comprises a catalyst. In some embodiments, the solution is an aqueous solution. In some embodiments, the solution comprises sea water. In some embodiments, the solution comprises wastewater. In some embodiments the solution comprises a catalyst.

In some embodiments, the system includes a cooling element, an insulation element and/or heating element located in the solution compartment 116. In some embodiments, solution compartment 116 comprises an insulating sleeve or wrap (not shown) that insulates solution compartment 116 from ambient temperature. In some embodiments, insulating sleeve or wrap comprises a double wall having a layer of air in-between. In some embodiments, insulating sleeve or wrap comprises a layer of foam. In some embodiments, solution compartment 116 a temperature controlling sleeve or wrap (not shown) that includes heating and/or cooling elements encircling the circumference of solution compartment 116. The heating elements may include, for example, one or more of an electrical heating element, a hot water conduit or hot air duct. The cooling elements may include, for example, one or more of a cold water conduit, a cold air duct or Peltier cooling system.

According to an aspect of some embodiments of the present invention, there is provided a method for producing hydrogen using a hydrogen production device as described elsewhere herein. In some embodiments, the method comprises providing a solid to the solid compartment of the hydrogen production device. In some embodiments, the method comprises contacting at least a portion of the solid with a solution thereby dissolving a portion of the solid. In some embodiments, the method comprises transporting the solution containing a portion of the solid to the solution compartment, thereby triggering a chemical reaction as described elsewhere herein resulting in generation of hydrogen.

In some embodiments, the solid comprises a metal hydride. In some embodiments, the solution is an aqueous solution. In some embodiments, the solution comprises sea water. In some embodiments, the solution comprises wastewater. In some embodiments the solution comprises a catalyst. In some embodiments, the solid comprises a catalyst.

Hydrogen Production from Metal Hydrides

In some embodiments, metal hydrides are used in the hydrogen production device of the present invention. These metal hydrides have the general chemical formula $MBH_4$, wherein M is an alkali metal selected from Group 1 (formerly Group IA) of the periodic table, examples of which include lithium, sodium or potassium. In some embodiments, M may also be ammonium or organic groups. B is an element selected from group 13 (formerly Group IIIA) of the periodic table, examples of which include boron, aluminum, and gallium. H is hydrogen. Examples of metal hydrides to be used in accordance with the present invention include, but are not limited to, $NaBH_4$, $LiBH_4$, $KBH_4$, $NH_4BH_4$, $(CH_3)_4NH_4BH_4$, $NaAlH_4$, $LiAlH_4$, $KAlH_4$, $NaGaH_4$, $LiGaH_4$, $KGaH_4$, and mixtures thereof.

In some embodiments, examples of metal hydrides to be used in accordance with the present invention include, but are not limited to, $NaH$, $NaAlH_4$, $CaH_2$, $MgH_2$, $Mg(AlH_4)_2$, $LiAlH_4$, $Be(AlH_4)_2$, $Zr(AlH_4)_2$, $Ca(AlH_4)_2$, $Li_3AlH_6$ and $Na_3AlH_6$.

In some embodiments, the metal hydride is a borohydride. In some embodiments, borohydride is sodium borohydride ($NaBH_4$), lithium borohydride ($LiBH_4$), potassium borohydride ($KBH_4$), ammonium borohydride ($NH_4BH_4$), tetramethyl ammonium borohydride ($(CH_3)_4NH_4BH_4$), quaternary borohydrides, and mixtures thereof. In some embodiments, the borohydride is sodium borohydride ($NaBH_4$).

Hydrogen gas ($H_2$) and borate ($BO_2$—) are generated by reacting borohydride with water, as illustrated by chemical reaction (1) below.

$$NaBH_4 + 2H_2O \rightarrow NaBO_2 + 4H_2 \quad (1)$$

In some embodiments, the concentration of $NaBO_2$ increases with time.

In some embodiments, a catalyst is used to accelerate the reaction. In some embodiments, catalysts used in the present invention include, but are not limited to, transitions metals, transition metal borides, alloys of these materials, and mixtures thereof.

In some embodiments, transition metal catalysts, as used herein, are catalysts containing Group IB to Group VIIIB metals of the periodic table or compounds made from these metals. Representative examples of these metals include, but are not limited to, transition metals represented by the copper group, zinc group, scandium group, titanium group, vanadium group, chromium group, manganese group, iron group, cobalt group, and nickel group. Transition metal elements or compounds catalyze chemical reaction (1) and aid in the hydrolysis of water by adsorbing hydrogen on their surface in the form of atomic H, i.e., hydride $H^-$ or protonic hydrogen $H^+$. Examples of useful transition metal elements and compounds include, but are not limited to, ruthenium, iron, cobalt, nickel, copper, manganese, rhodium, rhenium, platinum, palladium, chromium, silver, osmium, iridium, borides thereof, alloys thereof, and mixtures thereof.

In some embodiments, the term "transition metal ion" as used herein, refers to an anion, a cation, an anion complex or a cation complex of a transition metal that is described above. Transition metal ions can be obtained from dissolving salts of transition metals, which are readily available from commercial manufacturers, such as Alpha Company and Aldrich Company. The transition metal salts may be dissolved in any solvent, typically water. The reducing agent can be any material or compound that is capable of reducing the transition metal ion to its neutral valence state. Nonlimiting examples of reducing agents include hydrazine, hydrogen gas, glucose hydroxylamine, carbon monoxide, dithionite, sulfur dioxide, borohydride, alcohols and mixtures thereof. Typically, most transition metals that catalyze metal hydrides, such as borohydride, can also be reduced by the same metal hydrides. For example, borohydride is a suitable reducing agent.

In some embodiments, the solution of the present invention includes (i) at least one catalyst, and (ii) a solvent. In some embodiments, the solution of the present invention includes (i) at least one catalyst, (ii) a solvent, and (iii) a metal hydride.

The term "solution," as used herein, includes a liquid in which all the components are dissolved and/or a slurry in which some of the components are dissolved and some of the components are undissolved solids.

In some embodiments, the solution of the present invention includes at least one stabilizing agent. In some embodiments, the term "stabilizing agent" as used herein, is any component which retards, impedes, or prevents the reaction of metal hydride with water. In some embodiments, effective stabilizing agents maintain metal hydride solutions at a room temperature (25° C.) pH of greater than about 7, greater than about 11, greater than about 13, or greater than about 14, including any value and range therebetween.

Hydrogen Production Device

Reference is made to FIG. 1, which is an exploded view simplified illustration of some of the components of a hydrogen production device, according to some embodiments of the invention. In some embodiments, a hydrogen production device 100 comprises a solid-containing compartment 110 configured to contain a solid 112. In some embodiments, the hydrogen production device 100 comprises a solution compartment 116 with a hydrogen gas outlet 130 and a solution outlet 134. In some embodiments, the hydrogen production device 100 comprises a fluid channel 114 between the solid compartment 110 and the solution compartment 116. In some embodiments, the fluid channel 114 comprises a solution inlet 138, configured for fluid communication with the solution outlet 134 as explained elsewhere herein. In some embodiments, hydrogen production device 100 comprises a partition 118 between the solid 112 in solid-containing compartment 110 and fluid in fluid channel 114. In some embodiments, the solid compartment 110 comprises an opening, facing the fluid channel 114.

Figure 2:
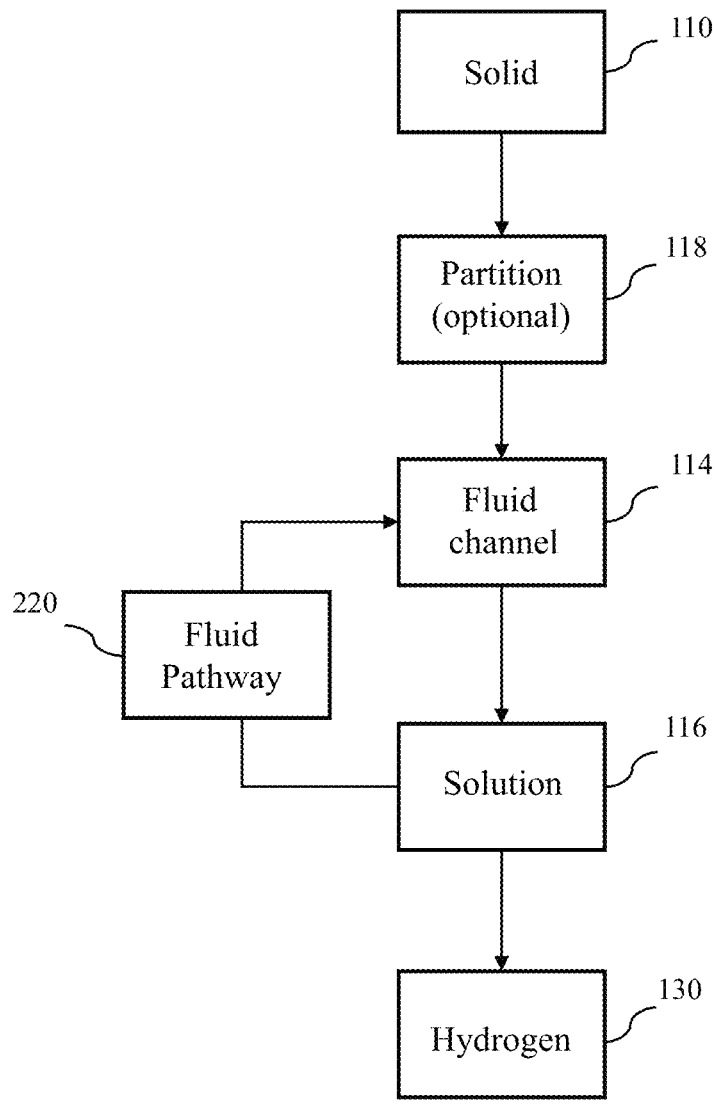
FIG. 2 is a block diagram of a gas production device, according to some embodiments of the present invention.

Reference is made to FIG. 2, which is a block diagram of a hydrogen production device in accordance with some embodiments of the invention. According to some embodiments, operation of the hydrogen production device comprises a solid such as, for example, sodium borohydride placed in the solid containing compartment 110. In some embodiments, a solution flows from the solution containing compartment 116, via the fluid pathway 220 through the fluid channel 114. In some embodiments, at least a portion of fluid flowing through fluid channel 114 contacts at least a portion of the solid in solid-containing compartment 110, thereby dissolving at least a portion of the solid. In some embodiments, the dissolved solid contained in the fluid channel 114 is transported to the solution compartment 116, thereby triggering a chemical reaction as described elsewhere herein resulting in generation of hydrogen released through an outlet 130.

Figure 3:
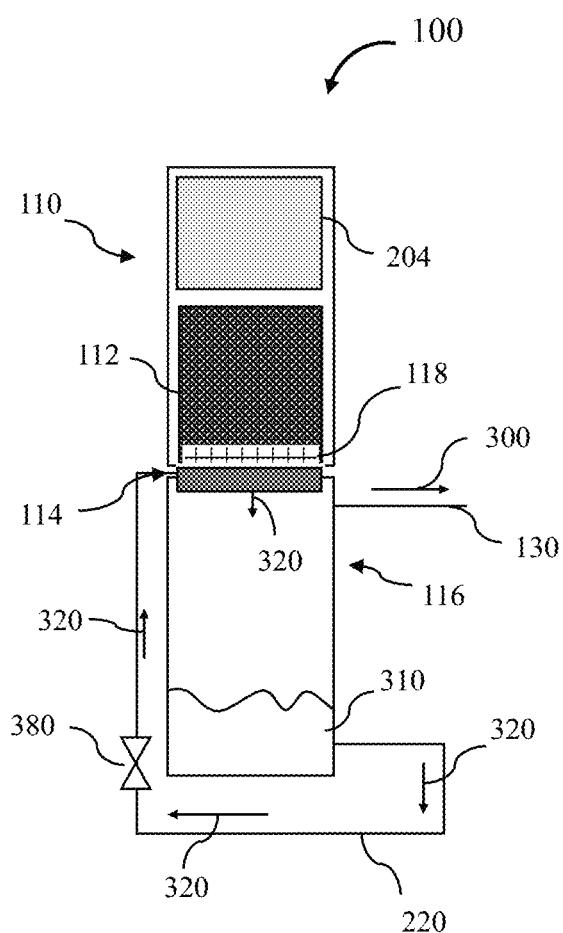
FIG. 3 is a plan view simplified illustration of a gas production device, according to some embodiments of the present invention.

Reference is made to FIG. 3, which is a plan view simplified illustration of an exemplary hydrogen production device, according to some embodiments of the present invention. In some embodiments, the hydrogen production device 100, comprises a solid containing compartment 110, configured to contain a solid 112. In some embodiments, a solid, e.g, sodium borohydride, 112 is placed in the solid containing compartment 110. In some embodiments, the solid 112 is in powder form. In some embodiments, solid containing compartment 110 comprises an actuator 204 arranged adjacent to the solid compartment 110. In some embodiments, the actuator 204 applies pressure onto the solid 112, therefore urging solid 112 that is contained in the solid container 110 towards the partition 118.

Reference is made to FIG. 3, which is a plan view simplified illustration of a hydrogen production device, according to some embodiments of the present invention. According to some embodiments, and as explained in greater detail elsewhere herein the device is implemented by transporting a portion of a solution 310 from the solution compartment 116 to the fluid channel 114 through a fluid pathway 220 in a predetermined flow direction, e.g. a direction indicated in FIG. 3 by fluid circulation 320. In some embodiments, the solid 112 is urged by actuator 204 against partition 118. In some embodiments, the solid 112 is fragmented as it crosses partition 118. in some embodiments, the solid 112 passes through the partition 118 and into the fluid channel 114. In some embodiments, the solid 112 in the fluid channel 114 is mix with a portion of a solution 310, and in some embodiments, the solid 112 fragments at least partially dissolve in the solution 310. The solution 310 and the dissolved solid 112 flow from the fluid channel 114 to the solution compartment 116. In some embodiments, a portion of the solution 310 and dissolved solid 112 enter the solution compartment 116 and are mixed with the remaining solution 310 in the solution compartment 116. In some embodiments, a chemical reaction as described elsewhere herein occurs between a portion of the solid 112 and a portion of the solution 310, in which hydrogen 300 is released from the solution. In some embodiments, the hydrogen 300 exits the solution compartment 116 through the hydrogen gas outlet 130.

In some embodiments, the fluid pathway 220 is a closed pathway. In some embodiments, the solution 310 is an aqueous solution. In some embodiments, the solution 310 comprises a catalyst. In some embodiments, no external solution is added to the already existing solution 310 in the solution compartment 116. In some embodiments a catalyst is embedded in the solution compartment 116. In some embodiments, the solid 112 comprises a catalyst. In some embodiments, a catalyst is embedded in the solid containing compartment 110. In some embodiments, the catalyst is embedded in the partition 118. In some embodiments, the fluid flow is regulated. In some embodiments, the fluid flow is generated by at least one fluid flow driver 380 placed along the fluid pathway 220. In some embodiments, the fluid flow driver 380 is one or more of a pump, a pressure differentiator, and a gravitational apparatus or any other suitable. In some embodiments, the pressure differentiator detects the differential pressure of the fluid channel 114 and the fluid pathway 220.

Fluid Channel and Fluid Pathway

According to one aspect of the present invention, the hydrogen production device comprises a fluid pathway 220 from a solution compartment 116 to a fluid channel 114. In some embodiments the fluid circulation 320 shows the flow of the fluid from the solution compartment 116, through the fluid pathway 220, and through the fluid channel 114. In some embodiments, the fluid channel 114 brings the solution 310 in contact with the solid 112. In some embodiments, the fluid pathway 220 provides fluid communication between the solution compartment 116 and the fluid channel 114. In some embodiments, the fluid channel 114, is configured to ensure optimal distribution of the solution 310. In some embodiments, the fluid communication is generated by a fluid flow driver 380. In some embodiments, the fluid communication is regulated by a fluid flow driver 380. In some embodiments, the fluid flow driver 380 is one or more of a pump, a pressure differentiator, and a gravitational apparatus. In some embodiments, the pressure differentiator detects the differential pressure of the fluid channel 114 and the fluid pathway 220.

In some embodiments, a portion of the solution 310 circulates from the solution compartment 116 through the fluid pathway 220 and to the fluid channel 114. In some embodiments, during the circulation of the portion of the solution 310, the circulating portion of the solution 310 contacts at least a portion of the solid 112, dissolving it. In some embodiments, the dissolved solid is transported with the solution 310 into the solution compartment 116, where it is mixed with the remaining solution 310, thereby triggering a chemical reaction as described elsewhere herein resulting in generation of hydrogen 300. In some embodiments, the produced hydrogen 300 is released through an outlet 130.

Figure 4A:
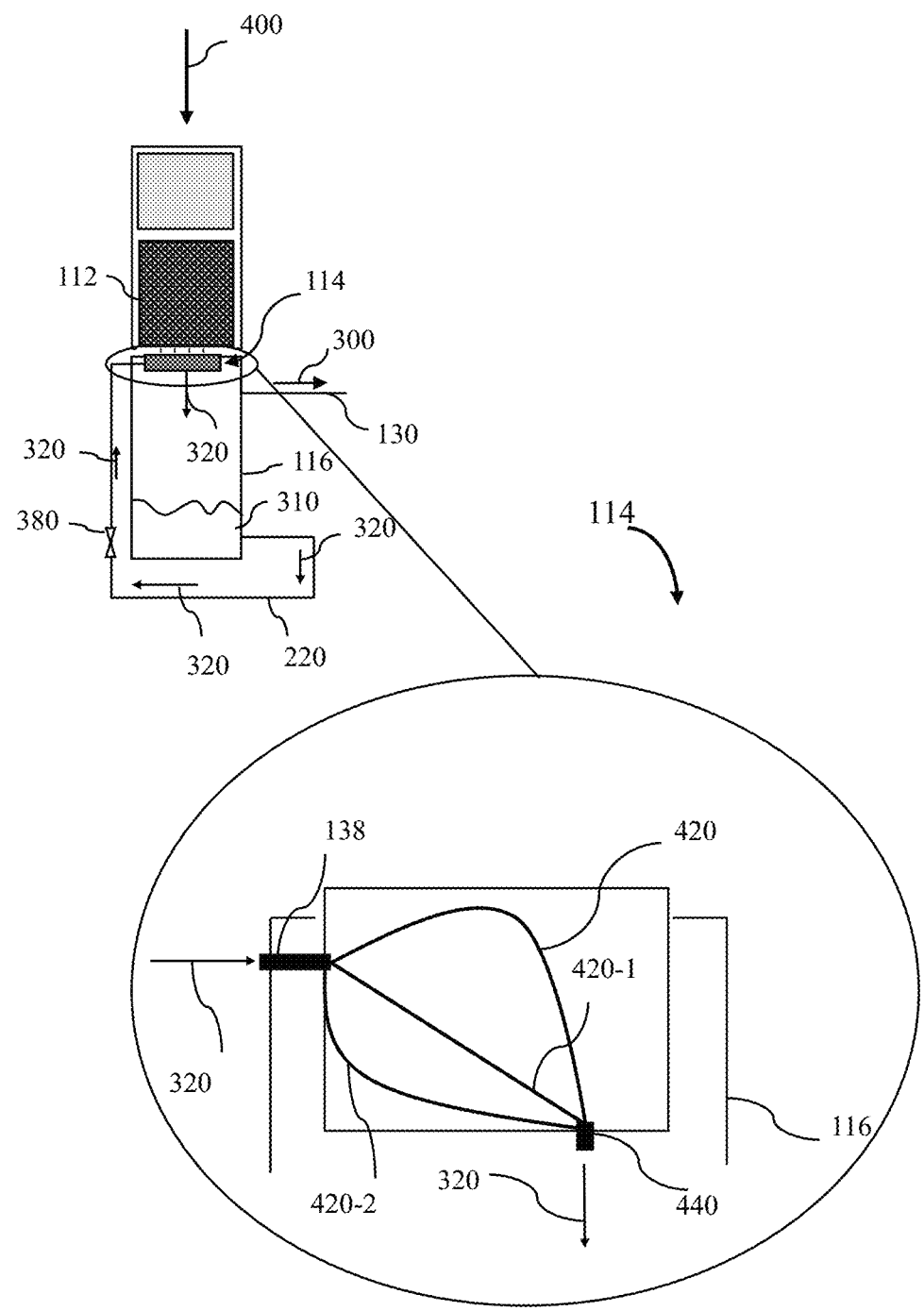
FIGS. 4A-D are plan view simplified illustrations of fluid channels, according to some embodiments of the present invention.

Reference is made to FIG. 4A which illustrates, according to some embodiments of the present invention, a view of an exemplary fluid channel 114 from a direction normal to the plane of flow in the fluid pathway, as indicated in arrow 400.

According to an aspect of the present invention, a portion of the fluid channel 114 is partially open. In some embodiments, portion of the fluid channel 114 comprises an opening along at least a portion of its length. In some embodiments, the opening is facing the solid compartment 110. In some embodiments, the opening allows entrance of solid 112 into the fluid channel 114.

In some embodiments of the fluid channel 114, such as depicted in FIG. 4A, the fluid channel 114 comprises conduits 420, 420-1 and 420-2. In some embodiments, the conduits 420, 420-1, and 420-2 are predesigned to optimize the circulation 320 of the solution. The conduits 420, 420-1, and 420-2 comprise an opening along at least a portion of their length facing the solid compartment 110. In some embodiments, the opening of the conduit 420, 420-1 and 420-2 are in contact with the solid 112.

Figure 4B:
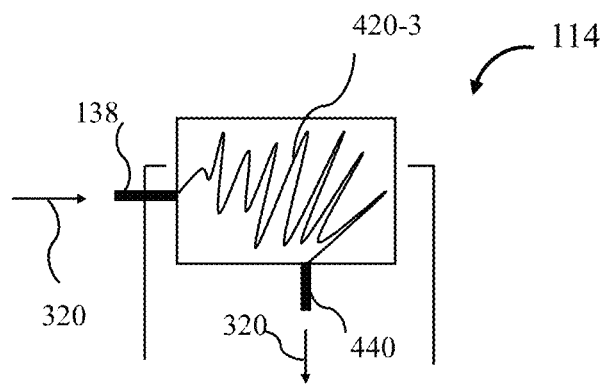
Figure 4C:
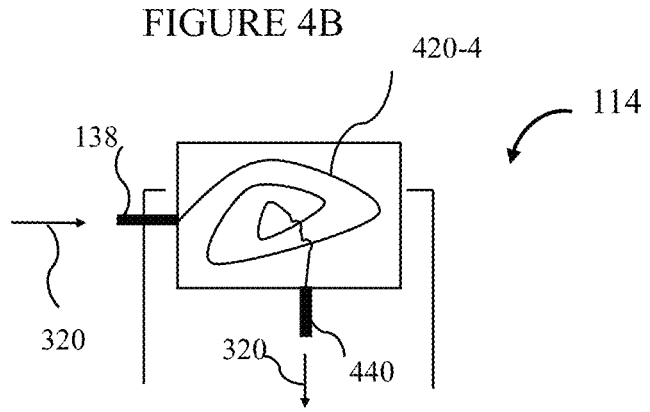
Figure 4D:
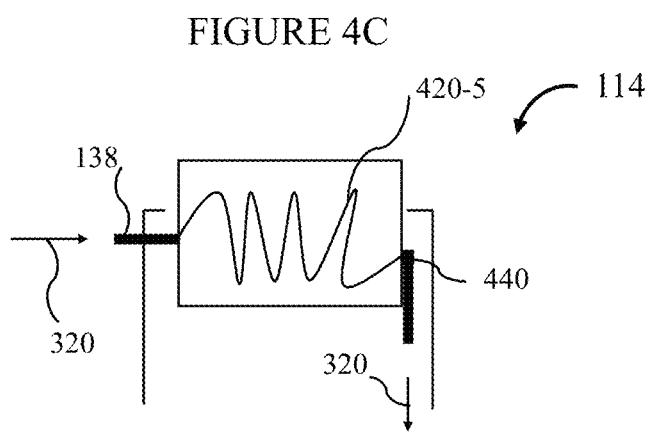

Reference is made to FIGS. 4B, 4C and 4D, which are plan views simplified illustrations of fluid channels and according to some embodiments of the present invention, the FIGS. 4B-4D are non-limiting examples of fluid channels 114. In some embodiments, the shape of conduit 420 is variable. In some embodiments, the shape of the conduit 420, is configured to ensure maximum dispersion of the solution 310 in respect to the surface area of the portion of the solid 112 within the channel 114. For example, in some embodiments, conduit 420 has zig-zag geometry (420-3). In some embodiments, conduit 420 has a spiral geometry 420-4. In some embodiments, the conduit 420 has a curved geometry 420-5. In some embodiments, non-limiting examples of the conduit 420 shape are a straight line, a curve, a zig-zag (FIG. 4B, 420-3), a loop, multiple loops, or a spiral. In some embodiments, the conduit 420-420-5 is in the shape of a spiral. In some embodiments, the conduit 420 has rounded walls. In some embodiments, the conduit 420 has straight edge walls. In some embodiments, the depth of the conduit is designed for optimal dispersion of the solution 310 in respect to the surface area of the portion of the solid 112.

According to an aspect of the present invention, the fluid flow rate is affected by the number of turns in the spiral. In some embodiments, the fluid flow rate is adjusted according to the number of turns in the spiral. In some embodiments, the fluid flow rate is proportional to the number of turns in the spiral. In some embodiments, the spiral has between 2 turns and 50 turns. In some embodiments, the spiral has between 2 turns and 30 turns. In some embodiments, the spiral has between 5 turns and 50 turns. In some embodiments, the spiral has between 10 turns and 50 turns. In some embodiments, the spiral has between 2 turn and 20 turns. In some embodiments, the spiral has between 2 turns and 15 turns.

In some embodiments, the fluid flow rate is in the range of 1 ml/min to 200 ml/min. In some embodiments, the fluid flow rate is in the range of 10 ml/min to 150 ml/min. In some embodiments, the fluid flow rate is in the range of 50 ml/min to 100 ml/min. In some embodiments, the fluid flow rate is in the range of 1 ml/min to 40 ml/min. In some embodiments, the fluid flow rate is in the range of 1 ml/min to 30 ml/min. In some embodiments, the fluid flow rate is in the range of 1 ml/min to 20 ml/min.

Figure 5:
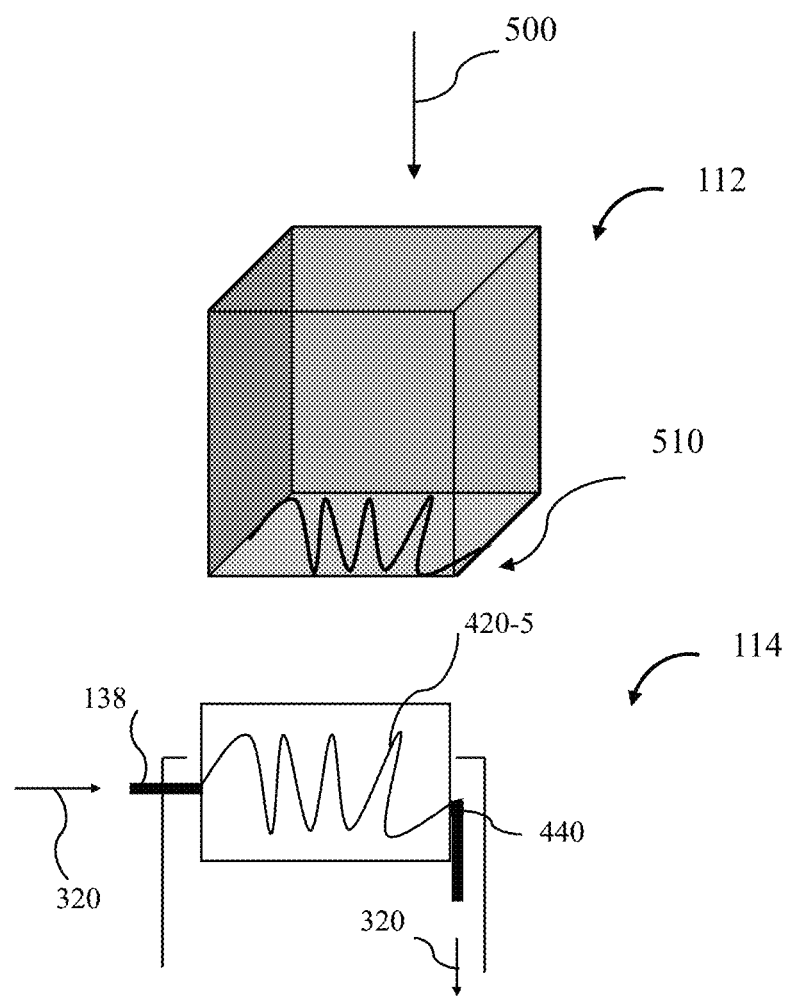
FIG. 5 is a perspective view and top view simplified illustrations of a contact surface between a solid and a fluid channel, according to some embodiments of the present invention.

Reference is made to FIG. 5, which is a perspective view and top view simplified illustration of a contact surface between a solid and a fluid channel, according to some embodiments of the present invention. The top view in FIG. 5, taken from a direction indicated by the arrow 500, illustrates a non-limiting example of the contact surface area 510 between fluid channel 114 and solid 112.

According to an aspect of the present invention, the hydrogen generation rate is affected by the contact surface area between the solid 112 and the channel 420-5. In some embodiments, the hydrogen production rate is controlled in accordance with a size and shape of the channel 420-5. In some embodiments, the contact surface area between channel 420-5 and the solid 112 is in the range of 10% to 98% of the total surface area of the opening of the channel 420-5 towards the solid compartment 110. In some embodiments, the contact surface area between channel 420-5 and the solid 112 is in the range of 10% to 80% of the total surface area of the opening of the channel 420-5 towards the solid compartment 110. In some embodiments, the contact surface area between channel 420-5 and the solid 112 is in the range of 10% to 30% of the total surface area of the opening of the channel 420-5 towards the solid compartment 110. In some embodiments, the contact surface area between channel 420-5 and the solid 112 is in the range of 10% to 50% of the total surface area of the opening of the channel 420-5 towards the solid compartment 110. In some embodiments, the contact surface area between channel 420-5 and the solid 112 is in the range of 20% to 60% of the total surface area of the opening of the channel 420-5 towards the solid compartment 110. In some embodiments, the contact surface area between channel 420-5 and the solid 112 is in the range of 20% to 98% of the total surface area of the opening of the channel 420-5 towards the solid compartment 110. In some embodiments, the contact surface area between channel 420-5 and the solid 112 is in the range of 60% to 98% of the total surface area of the opening of the channel 420-5 towards the solid compartment 110. In some embodiments, the contact surface area between channel 420-5 and the solid 112 is in the range of 70% to 98% of the total surface area of the opening of the channel 420-5 towards the solid compartment 110. In some embodiments, the contact surface area between channel 420-5 and the solid 112 is in the range of 75% to 98% of the total surface area of the opening of the channel 420-5 towards the solid compartment 110. In some embodiments, the contact surface area between channel 420-5 and the solid 112 is in the range of 80% to 98% of the total surface area of the opening of the channel 420-5 towards the solid compartment 110.

In some embodiments, the contact surface area between channel 420-5 and the solid 112 is in the range of 10% to 99% of the total contact surface area of the solid 112. In some embodiments, the contact surface area between channel 420-5 and the solid 112 is in the range of 10% to 98%, 10% to 80%, 10% to 50%, 20% to 99%, 20% to 80%, 60% to 70%, of the total contact surface area between the opening of channel 420-5 and the solid 112, including any range therebetween.

In some embodiments, hydrogen is produced at a rate in the range of 10 ml/min to 800 ml/min. In some embodiments, hydrogen is produced at a rate in the range of 50 ml/min to 500 ml/min. In some embodiments, hydrogen is produced at a rate in the range of 100 ml/min to 400 ml/min. In some embodiments, hydrogen is produced at a rate in the range of 200 ml/min to 400 ml/min.

According to an aspect of the present invention, the inlet 138 and outlet 440 of the fluid channel 114 are in fluid communication with the solution 310 (FIG. 3) in the solution compartment.

In some embodiments, the fluid channel 114 comprises an inlet 138 and an outlet 440. In some embodiments, the outlet 440 is in fluid communication with the solution compartment 116. In some embodiments, the position of the solution inlet 138 and the outlet 440 is variable. In some embodiments, the position of the inlet 138 and the outlet 440 allow optimal dispersion of the solution 310 in respect to the surface area of the portion of the solid 112 within the channel 114.

Solid Containing Compartment

Figure 6:
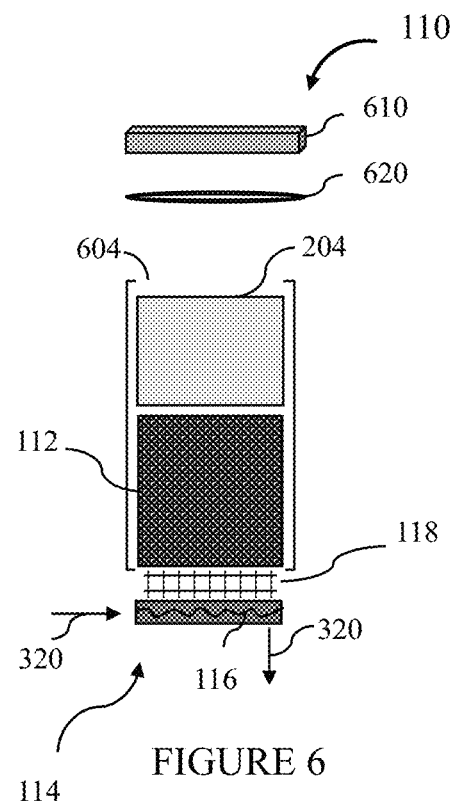
FIG. 6 is a cross-section view simplified illustration of a solid containing compartment, according to some embodiments of the present invention.

As illustrated by FIG. 6, which is a cross-section view simplified illustration of a solid containing compartment, according to some embodiments of the present invention, the hydrogen production device includes a solid containing compartment 110. In some embodiments, the solid containing compartment 110 comprises a solid 112. In some embodiments, the solid 112 comprises $NaBH_4$. In some embodiments, $NaBH_4$ is powder. In some embodiments $NaBH_4$ is granular.

In some embodiments, the solid 112 is introduced in the solid containing compartment 110 via an opening 604. In some embodiments, the solid containing compartment 110 comprises a lid 610. In some embodiments, the lid 610 is removable. In some embodiments, the lid 610 is a screwed lid. In some embodiments, the lid 610 is pressure resistant. In some embodiments, the lid 610 sustains a pressure in the range of 0.5 bar to 10 bar. In some embodiments, the lid 610 sustains a pressure in the range of 0.5 bar to 5 bar. In some embodiments, the lid 610 sustains a pressure in the range of 1 bar to 5 bar. In some embodiments, the lid 610 sustains a pressure in the range of 1 bar to 3 bar. In some embodiments, the lid 610 sustains a pressure in the range of 5 bar to 10 bar.

In some embodiments, the solid containing compartment 110 comprises a sealer 620. In some embodiments, the lid 610 and the sealer 620 maintain the solid containing compartment 110 airtight. In some the lid 610 and the sealer 620 prevent hydrogen leakage. In some embodiments, the lid 610 and the seal 620 are re-sealable.

In some embodiments, the actuator 204 applies pressure in at least a portion of the solid 112. In some embodiments, the actuator 204 urges the solid 112 towards the partition 118. In some embodiments, the applied force (F) of the actuator 204 is controllable. In some embodiments, the hydrogen generation rate is controlled by the applied force (F) of the actuator 204. In some embodiments, the actuator 204 urges the solid 112 towards the partition 118 with an applied force (F) in the range of 1 N to 100 N. In some embodiments, the actuator 204 urges the solid 112 towards the partition 118 with an applied force (F) in the range of 10 N to 100 N. In some embodiments, the actuator 204 urges the solid 112 towards the partition 118 with an applied force (F) in the range of 1 N to 50 N. In some embodiments, the actuator 204 urges the solid 112 towards the partition 118 with an applied force (F) in the range of 10 N to 50 N. In some embodiments, the actuator 204 urges the solid 112 towards the partition 118 with an applied force (F) in the range of 20 N to 60 N.

In some embodiments, the shape of the actuator 204 is can have various geometries. For example, in some embodiments, the actuator 204 shape is in a form of a screw, a spring, a piston, or a bag. In some embodiments, the actuator 204 comprises at least one spring. In some embodiments, the actuator 204 comprises at least two springs. In some embodiments, at least one spring has a spring coefficient (k) in the range of 100 N/m to 1000 N/m. In some embodiments, at least one spring has a spring coefficient (k) in the range of 100 N/m to 500 N/m. In some embodiments, at least one spring has a spring coefficient (k) in the range of 130 N/m to 1000 N/m. In some embodiments, at least one spring has a spring coefficient (k) in the range of 150 N/m to 1000 N/m. In some embodiments, at least one spring has a spring coefficient (k) in the range of 170 N/m to 1000 N/m. In some embodiments, at least one spring has a spring coefficient (k) in the range of 200 N/m to 1000 N/m. In some embodiments, at least one spring has a spring coefficient (k) in the range of 300 N/m to 1000 N/m. In some embodiments, at least one spring has a spring coefficient (k) in the range of 400 N/m to 1000 N/m. In some embodiments, at least one spring has a spring coefficient (k) in the range of 500 N/m to 1000 N/m.

In some embodiments, at least two springs have a spring coefficient (k) in the range of 100 N/m to 1000 N/m. In some embodiments, at least two springs have a spring coefficient (k) in the range of 100 N/m to 500 N/m. In some embodiments, at least two springs have a spring coefficient (k) in the range of 130 N/m to 1000 N/m. In some embodiments, at least two springs have a spring coefficient (k) in the range of 150 N/m to 1000 N/m. In some embodiments, at least two springs have a spring coefficient (k) in the range of 170 N/m to 1000 N/m. In some embodiments, at least two springs have a spring coefficient (k) in the range of 200 N/m to 1000 N/m. In some embodiments, at least two springs have a spring coefficient (k) in the range of 300 N/m to 1000 N/m. In some embodiments, at least two springs have a spring coefficient (k) in the range of 400 N/m to 1000 N/m. In some embodiments, at least two springs have a spring coefficient (k) in the range of 500 N/m to 1000 N/m.

In some embodiments, the solid 112 is continuously in contact with at least a portion of the partition 118. In some embodiments, at least a portion of the solid 112 passes through the partition 118 and contacts the solution 310 circulating in the fluid channel 114. In some embodiments, the partition 118 prevents at least a portion of the solid from falling into the fluid channel 114. In some embodiments, the partition 118 is partially in contact with the solution 116 in the fluid channel 114.

Solution Compartment

Figure 7:
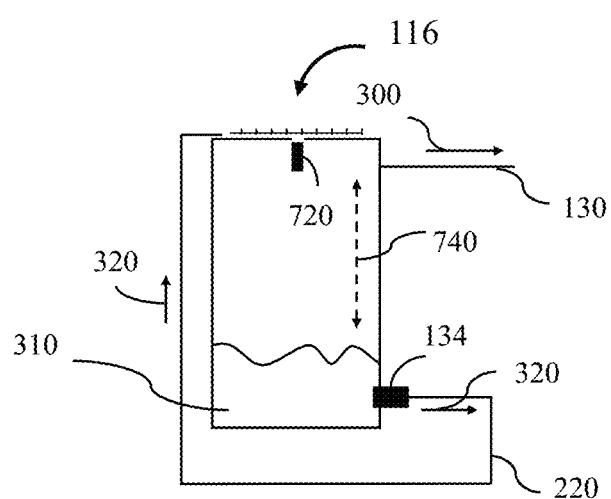
FIG. 7 is a cross-section view simplified illustration of a solution compartment, according to some embodiments of the present invention.

According to an aspect of the present invention, the hydrogen production device comprises a solution compartment 116. FIG. 7 illustrates, according to some embodiments of the present invention, a planar view of a solution compartment 116. In some embodiments, the solution compartment 116 is airtight. In some embodiments, the solution compartment 116 prevents hydrogen leakage.

In some embodiments, the solution compartment 116 sustains pressure in the range of 0.1 bar to 10 bar. In some embodiments, the solution compartment 116 sustains pressure in the range of 0.1 bar to 5 bar. In some embodiments, the solution compartment 116 sustains pressure in the range of 0.5 bar to 5 bar. In some embodiments, the solution compartment 116 sustains pressure in the range of 1 bar to 10 bar. In some embodiments, the solution compartment 116 sustains pressure in the range of 1 bar to 5 bar.

In some embodiments, the solution compartment 116 sustains a temperature from 0° C. to 100° C. In some embodiments, the solution compartment 116 sustains a temperature from 10° C. to 100° C. In some embodiments, the solution compartment 116 sustains a temperature from 20° C. to 100° C. In some embodiments, the solution compartment 116 sustains a temperature from 20° C. to 90° C. In some embodiments, the solution compartment 116 sustains a temperature from 0° C. to 90° C.

In some embodiments, the solution compartment 116, comprises a solution outlet 134 below the solution 310 level.

In some embodiments, the solution compartment 116, comprises an outlet 130 above the solution 310 level. In some embodiments, the outlet 130 is sufficiently above the solution 310 level to avoid solution leakage through the outlet 130. In some embodiments, the solution compartment 116 comprises an outlet 130 at least 10 cm above the solution 310 level. In some embodiments, the solution compartment 116 comprises an outlet 130 at least 20 cm above the solution 310 level. In some embodiments, the solution compartment 116 comprises an outlet 130 at least 30 cm above the solution 310 level. In some embodiments, the solution compartment 116 comprises an outlet 130 at least 40 cm above the solution 310 level. In some embodiments, the solution compartment 116 comprises an outlet 130 in the range of 10 cm to 100 cm above the solution 310 level. In some embodiments, the solution compartment 116 comprises an outlet 130 in the range of 10 cm to 100 cm above the solution 310 level. In some embodiments, the solution compartment 116 comprises an outlet 130 in the range of 10 cm to 50 cm above the solution 310 level. In some embodiments, the solution compartment 116 comprises an outlet 130 in the range of 10 cm to 70 cm above the solution 310 level. In some embodiments, the solution compartment 116, comprises an outlet 130 in the range of 10 cm to 60 cm above the solution 310 level.

In some embodiments, the solution compartment 116, comprises an inlet 720 above the solution 310 level. In some embodiments, the solution compartment 116, comprises an inlet 720 in the range of 10 cm to 100 cm above the solution 310 level. In some embodiments, the solution compartment 116, comprises an inlet 720 in the range of 10 cm to 100 cm above the solution 310 level. In some embodiments, the solution compartment 116, comprises an inlet 720 in the range of 10 cm to 50 cm above the solution 310 level. In some embodiments, the solution compartment 116, comprises an inlet 720 in the range of 10 cm to 70 cm above the solution 310 level. In some embodiments, the solution compartment 116, comprises an inlet 720 in the range of 10 cm to 60 cm above the solution 310 level.

In some embodiments, the inlet 720 is in fluid communication with the outlet 440 of the fluid channel 114. In some embodiments, the solid 110 is partially dissolved in a portion of the solution 310, which is delivered from the fluid channel 114 to the solution compartment 116 through fluid communication between the outlet 440 (FIG. 4) and the inlet 720, thereby triggering a chemical reaction as described elsewhere herein resulting in generation of hydrogen 300.

In some embodiments, the solution compartment 116 comprises a hydrogen storage area 740 above the solution 310 level as indicated by the dashed arrow in FIG. 7.

In some embodiments, the hydrogen gas 300 released from the solution 310 through the outlet 130 is supplied to a hydrogen collector. In some embodiments, the release of hydrogen 300 from the solution compartment 116 is regulated. In some embodiments the release of hydrogen from the solution compartment is regulated by a valve. In some embodiments the release of hydrogen from the solution compartment is regulated by a valve that is connected to the outlet 130.

Figure 8:
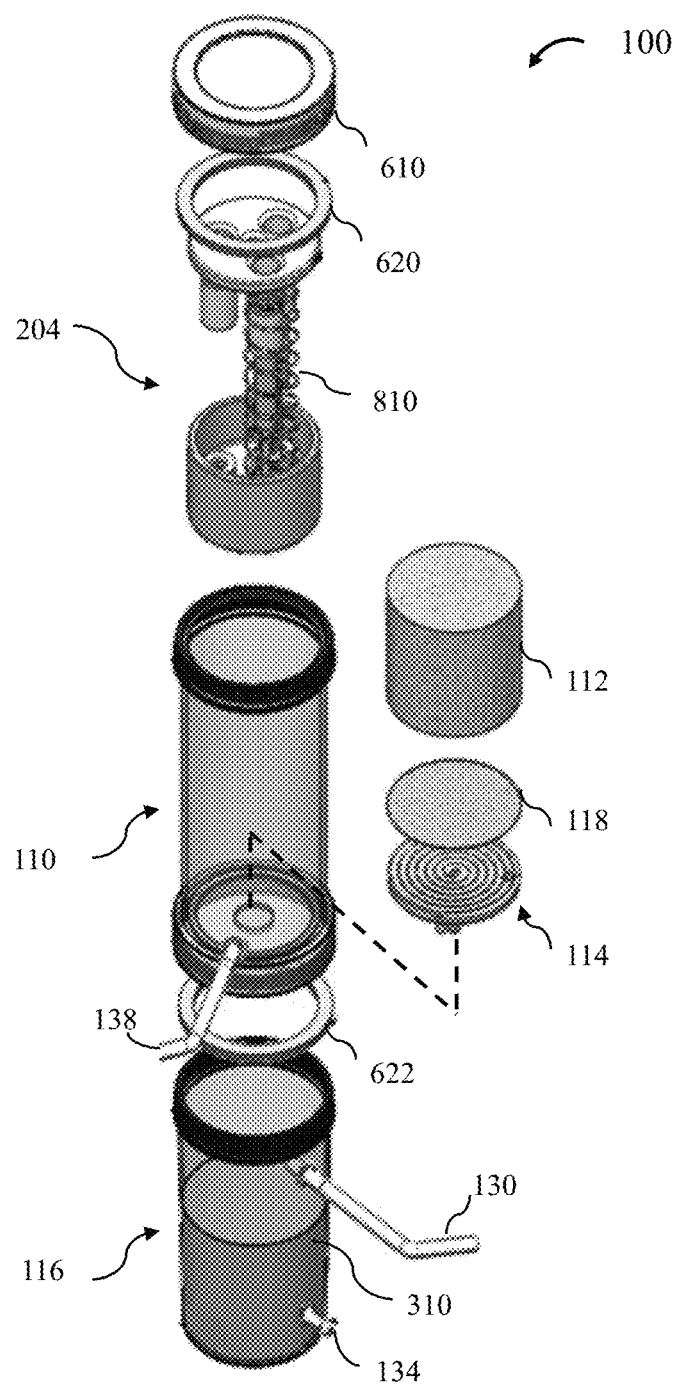
FIG. 8 is an exploded view simplified illustration of a gas production device, according to some embodiments of the present invention.

FIG. 8 illustrates an exploded view simplified illustration of the hydrogen production device 100 according to some embodiments of the invention.

In some embodiments, the hydrogen production device 100 comprises an O-ring 620. In some embodiments, the O-ring 620 comprises at least one rubber ring. In some embodiments, the O-ring 620 comprises least two rubber rings. In some embodiments, an O-ring 620 is placed between a lid 610 and an actuator 204. In some embodiments, an O-ring 620 is placed between a solid containing compartment 110 and a solution compartment 116. In some embodiments, the actuator 204 comprises one or more springs 810.

The System

Figure 9:
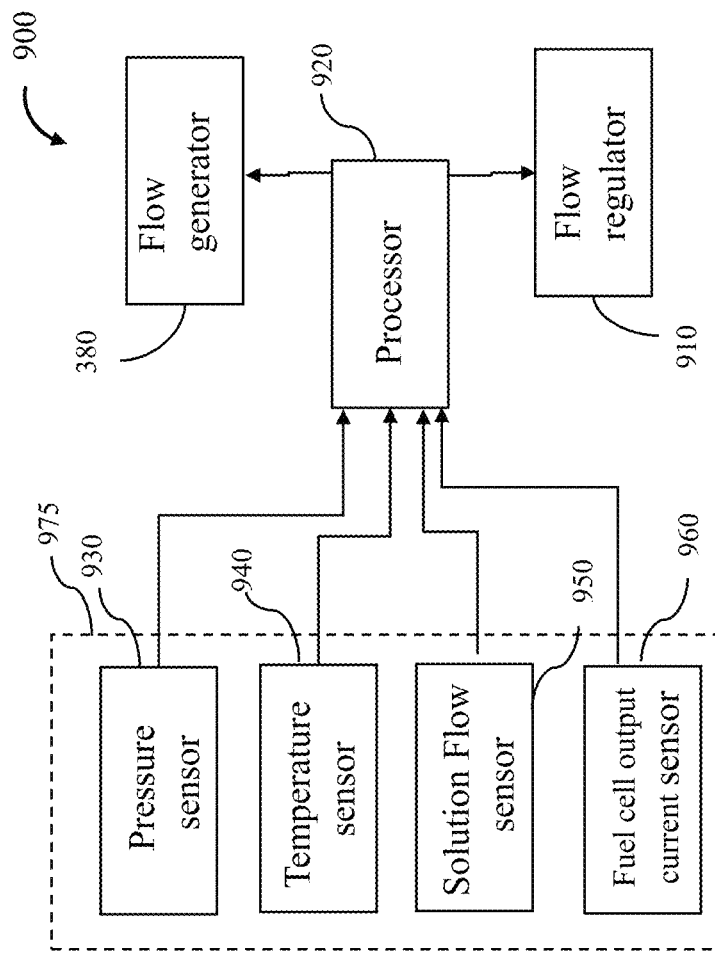
FIG. 9 is a block diagram of a system, according to some embodiments of the present invention.

Reference is made to FIG. 9, which is a block diagram of a system for controlling the production of hydrogen, according to some embodiments of the invention. In some embodiments, the system 900 comprises a processor 920. In some embodiments, the system comprises one or more of a flow driver 380 and a flow regulator 910. In some embodiments, the processor 920 communicates with the flow driver 380 and/or the flow regulator 910 via one or more communication channel e.g., electric cable, Wi-Fi, Bluetooth. In some embodiments, the processor 920 controls the operations of the flow driver 380 and/or the flow regulator. In some embodiments, the flow driver 380 communicates with the processor 920. In some embodiments, the flow regulator 910 communicates with the processor 920. In some embodiments, the flow driver 380 is one or more of a pump, a pressure differentiator, and a gravitational apparatus. In some embodiments, the pressure differentiator detects the differential pressure of the fluid channel 114 and the fluid pathway 220. In some embodiments, the flow regulator 910 is one or more of a pump or a valve. In some embodiments, the flow driver 380 and/or flow regulator are set between the fluid channel 114 and the solution compartment 116. In some embodiments, the flow driver 380 and/or flow regulator are set in the solution inlet 138. In some embodiments, the flow driver 380 and/or flow regulator are set in the solution outlet 440.

In some embodiments, the flow driver 380 comprises of one or more of a pressure sensor 930, a temperature sensor 940, and a solution flow sensor 950 and a fuel cell output current sensor 960. In some embodiments, the one or more of a pressure sensor 930, a temperature sensor 940, and a flow sensor 950 is placed in a section 975 of the system for controlling the production of hydrogen. In some embodiments, section 975 of the system for controlling the production of hydrogen is for example, one or more of hydrogen client 960, solid compartment 110, solution compartment 116, fluid pathway 220, fluid channel 114, flow driver 380, flow regulator 910, actuator 201, solution inlet 138, solution outlet 134.

In some embodiments, the flow regulator 910 comprises of one or more of a temperature sensor, and a flow sensor. In some embodiments, the processor 920 controls the flow rate in response to change in temperature in the flow driver 380. In some embodiments, the processor 920 controls the flow rate in response to change in pressure applied to the flow driver 380. In some embodiments, the processor 920 controls the flow rate in response to change in temperature in the flow regulator 910. In some embodiments, the processor 920 controls the flow rate in response to change in pressure applied to the flow regulator 910.

In some embodiments, the system comprises one or more of a pressure sensor 930, a temperature sensor 940, and a flow sensor 950 in communication with the processor 920.

In some embodiments, a pressure sensor 930 is attached to one or more of the actuator 204, the solid compartment 110 walls, the fluid channel 114, solution compartment 116 walls, and the hydrogen gas outlet 130. In some embodiments, the pressure sensor 930 samples the pressure continuously and sends the pressure data to the processor 920. In some embodiments, the pressure sensor 930 samples the pressure intermittently and sends the pressure data to the processor 920. In some embodiments, the processor 920 controls the frequency of samples received from the pressure sensor 930.

In some embodiments, a temperature sensor 940 is attached to one or more of the solid compartment 112, the fluid channel 114, the solution inlet 138, the solution chamber 134, and the hydrogen gas outlet 130. In some embodiments, the temperature sensor 940 samples the temperature continuously and sends the temperature data to the processor 920. In some embodiments, the temperature sensor 940 samples the temperature intermittently and sends the temperature data to the processor 920. In some embodiments, the processor 920 controls the frequency of samples received from the temperature sensor 940.

In some embodiments, a flow sensor 950 is attached to one or more of the solution inlet 138, the solution outlet 134, the fluid channel 114, and the hydrogen gas outlet 130. In some embodiments, the flow sensor 950 samples the flow continuously and sends the flow data to the processor 920. In some embodiments, the flow sensor 950 samples the flow intermittently and sends the flow data to the processor 920. In some embodiments, the processor 920 controls the frequency of samples received from the flow sensor 950.

A potential advantage of the pressure sensors, the temperature sensors, and the flow rate sensors is that the hydrogen production conditions, e.g. temperature, pressure, and flow rate, in which the hydrogen is produced within the hydrogen production device, can be regularly monitored and/or controlled. The monitoring of the hydrogen production conditions increases the safety of the procedure. In some embodiments, the monitoring of the hydrogen production conditions allows later optimization of the production parameters by the processor 920.

In some embodiments, the processor 920 controls the flow rate in response to changes in solution flow rate, changes in hydrogen flow rate, changes in solution concentration inside the solution compartment, signals e.g., voltage gradient, electrical pulses, received from a hydrogen client, e.g., fuel cell, hydrogen battery, changes in hydrogen pressure in one or more of the solution chamber, fluid channel, and hydrogen outlet, changes in temperature in one or more of the solution chamber, fluid channel, and hydrogen outlet, or any combination thereof.

In some embodiments, the system comprises a hydrogen client 960, such as e.g., fuel cell, hydrogen tank. In some embodiments, the hydrogen client 960 comprises of one or more of a pressure sensor, a temperature sensor, and flow sensor, which communicate with the processor 920. In some embodiments, the processor 920 controls the supply of hydrogen to the hydrogen client. In some embodiments, the processor 920 starts the hydrogen production in response to data received from a sensor of the hydrogen client. In some embodiments, the processor 920 ends the hydrogen production in response to data received from a sensor of the hydrogen client. In some embodiments, the processor 920 changes the hydrogen production rate in response to data received from a sensor of the hydrogen client. In some embodiments, the processor 920 controls the flow rate in response to data received from a sensor of the hydrogen client.

In some embodiments, the processor 920 compares the received data from the pressure sensors 930, the temperature sensor 940, and/or the flow sensor 950, with a predetermined range and/or threshold. In some embodiments, the processor 920 provides a flow driver 380 and/or flow regulator 910 with adjusted flow rate information based on the input received from the pressure sensors 930, the temperature sensor 940, and/or the flow sensor 950.

In some embodiments, the flow regulator 910 decreases the flow in response to a hydrogen pressure in the system between 0.7 and 5 bar. In some embodiments, the regulator 910 decreases the flow in response to a hydrogen pressure in the system between 0.7 and 1 bar. In some embodiments, the regulator 910 decreases the flow in response to a hydrogen pressure in the system between 1 and 5 bar. In some embodiments, the regulator 910 decreases the flow in response to a hydrogen pressure in the system between 0.7 and 2 bar.

In some embodiments, the regulator 910 increases the flow in response to a hydrogen pressure in the system between 0 bar and 0.8 bar. In some embodiments, the regulator 910 increases the flow in response to a hydrogen pressure in the system between 0 bar and 0.7 bar. In some embodiments, the regulator 910 increases the flow in response to a hydrogen pressure in the system between 0 bar and 0.6 bar. In some embodiments the regulator 910 increases the flow in response to a hydrogen pressure in the system between 0 bar and 0.5 bar. In some embodiments the regulator 910 increases the flow in response to a hydrogen pressure in the system between 0 bar and 0.4 bar. In some embodiments, the regulator 910 increases the flow in response to a hydrogen pressure in the system between 0 bar and 0.3 bar. In some embodiments, the regulator 910 increases the flow in response to a hydrogen pressure in the system between 0 bar and 0.2 bar. In some embodiments, the regulator 910 increases the flow in response to a hydrogen pressure in the system between 0 bar and 0.1 bar.

In some embodiments, the processor 920 controls the fluid flow rate. In some embodiments, the processor 920 controls hydrogen production by controlling the fluid flow rate.

In some embodiments, the processor 920 receives data from the pressure sensors, which measure the hydrogen pressure in the system. In some embodiments, the processor 920 receives data, e.g. hydrogen pressure measurements, from the pressure sensor in the solution compartment. In some embodiments, the processor 920 sends an output signal to the flow driver 380 in response to the received hydrogen pressure data. In some embodiments, the output data is in accordance with the data of the hydrogen pressure in the solution compartment. In some embodiments, the output signal from the processor 920 commands to stop the flow driver r 380. In some embodiments, the output signal from the processor 920 commands to start the flow driver 380. In some embodiments, the processor 920 is configured to start the flow driver 380 if the hydrogen pressure in the solution compartment 116 is between 0 bar and 0.9 bar. In some embodiments, the processor 920 is configured to start the flow driver r 380 if the hydrogen pressure in the solution compartment 116 is between 0 bar and 0.9 bar. In some embodiments, the processor 920 is configured to start flow driver 380 if the hydrogen pressure in the solution compartment 116 is between 0 bar and 0.8 bar. In some embodiments, the processor 920 is configured to start the flow driver 380 if the hydrogen pressure in the solution compartment 116 is between 0 bar and 0.7 bar. In some embodiments, the processor 920 is configured to start the flow driver 380 if the hydrogen pressure in the solution compartment 116 is between 0 bar and 0.6 bar. In some embodiments, the processor 920 is configured to start the flow driver 380 if the hydrogen pressure in the solution compartment 116 is between 0 bar and 0.5 bar. In some embodiments, the processor 920 is configured to start the flow driver 380 if the hydrogen pressure in the solution compartment 116 is between 0 bar and 0.4 bar. In some embodiments, the processor 920 is configured to start the flow driver 380 if the hydrogen pressure in the solution compartment 116 is between 0 bar and 0.3 bar. In some embodiments, the processor 920 is configured to start the flow driver 380 if the hydrogen pressure in the solution compartment 116 is between 0 bar and 0.2 bar. In some embodiments, the processor 920 is configured to start the flow driver 380 if the hydrogen pressure in the solution compartment 116 is between 0 bar and 0.1 bar.

In some embodiments, the processor 920 is configured to signal the flow driver 380 to stop if the hydrogen pressure in the solution compartment 116 is between 0.7 and 5 bar. In some embodiments, the processor 920 is configured to signal the flow driver 380 to stop if the hydrogen pressure in the solution compartment 116 is between 0.7 and 1 bar. In some embodiments, the processor 920 is configured to signal the flow driver 380 to stop if the hydrogen pressure in the solution compartment 116 is between 1 and 5 bar. In some embodiments, the processor 920 is configured to signal the flow driver 380 to stop if the hydrogen pressure in the solution compartment 116 is between 0.7 and 2 bar.

In some embodiments, the flow driver 380 is configured to work on a continuous flow. In some embodiments, the flow driver 380 is configured to work on demand.

In some embodiments, the processor 920 is configured to control the flow rate of the solution 310 by controlling the flow driver 380. In some embodiments, flow driver 380 works at variable flow rates. In some embodiments, the flow driver 380 works at a flow rate in the range of 1 ml/min to 200 ml/min. In some embodiments, the flow driver 380 works at a flow rate in the range of 1 ml/min to 100 ml/min. In some embodiments, the flow driver 380 works at a flow rate in the range of 50 ml/min to 200 ml/min. In some embodiments, the flow driver 380 works at a flow rate in the range of 10 ml/min to 70 ml/min. In some embodiments, the flow driver 380 works at a flow rate in the range of 1 ml/min to 50 ml/min. In some embodiments, the flow driver 380 works at a flow rate in the range of 1 ml/min to 40 ml/min. In some embodiments, the flow driver 380 works at a flow rate in the range of 1 ml/min to 30 ml/min. In some embodiments, the flow driver 380 works at a flow rate in the range of 1 ml/min to 20 ml/min.

In some embodiments, the processor 920 receives data from one or more of a pressure sensor, temperature sensor, flow sensor, of any combination thereof. In some embodiments, the processor 920 receives data inputted manually by a user. In some embodiments, the working conditions, e.g., temperature, pressure, flow rate, of the flow driver 380 and/or flow regulator 910 e.g., temperature, pressure, flow rate, are determined by the processor 920. In some embodiments, the working conditions e.g., temperature, pressure, flow rate, of the flow driver 380 and/or flow regulator 910 are inputted into the processor 920 by a user. In some embodiments, safety condition limits e.g., maximum temperature, minimum temperature, maximum pressure, minimum pressure, maximum flow rate, limit the flow driver 380 and/or flow regulator 910. In some embodiments, the safety condition limits are set by a user. In some embodiment, the safety condition limits are calculated by the processor 920.

In some embodiments, the processor 920 is configured to calculate solution resistance, solution level, temperature, flow, pressure, or any combination thereof. In some embodiments, processor 920 is configured to activate one or more solution compartment 116 heating and/or cooling elements as explained in greater detail elsewhere herein.

In some embodiments, the processor 920 is configured to control temperature, power, flow rate, pressure, or any combination thereof. In some embodiments, the processor 920 is configured to control the power in accordance with the fuel cell output current information received from fuel cell output current sensor 960.

In some embodiments, the processor 920 controls the power according to the solution level. In some embodiments, the processor 920 controls the power according to the temperature. In some embodiments, the processor 920 controls the power according to pressure.

In some embodiments, the system 900 generates hydrogen at a rate in the range of 1 ml/min to 500 ml/min. In some embodiments, the system 900 generates hydrogen at a rate in the range of 1 ml/min to 500 ml/min. In some embodiments, the system 900 generates hydrogen at a rate in the range of 10 ml/min to 500 ml/min. In some embodiments, the system 900 generates hydrogen at a rate in the range of 50 ml/min to 500 ml/min. In some embodiments, the system 900 generates hydrogen at a rate in the range of 70 ml/min to 500 ml/min. In some embodiments, the system 900 generates hydrogen at a rate in the range of 100 ml/min to 500 ml/min. In some embodiments, the system 900 generates hydrogen at a rate in the range of 1 ml/min to 300 ml/min. In some embodiments, the system 900 generates hydrogen at a rate in the range of 1 ml/min to 200 ml/min.

The Method

According to an aspect of some embodiments of the present invention, there is provided a method for generating hydrogen. In some embodiments, there is provided a method for generating hydrogen at a controlled rate. In some embodiments, the method comprises contacting a portion of a solid with a solution. In some embodiments, hydrogen is produced by controlling the flow rate of the solution. In some embodiments, hydrogen is produced by controlling the contact surface area of the solid and the solution. In some embodiments, hydrogen is produced by controlling the ratio between the flow rate of the solution and the contact surface area of the solution and the solid. In some embodiments, the method comprises the step of determining the ratio between the flow rate of the solution and the contact surface of the solid and the solution.

In some embodiments, the method comprises controlling the flow of a solution in contact with a solid. In some embodiments the flow is continuous. In some embodiments, the flow is pulsed. In some embodiments, the flow alternates between pulsed and continuous.

In some embodiments, the flow is pulsed between 1 min to 20 min. In some embodiments, the flow is pulsed between 1 min to 10 min. In some embodiments, the flow is pulsed between 1 min to 15 min. In some embodiments, the flow is pulsed between 1 min to 5 min. In some embodiments, the flow is pulsed between 1 min to 4 min. In some embodiments, the flow is pulsed between 1 min to 3 min. In some embodiments, the flow is pulsed between 1 min to 2 min.

In some embodiments, the contact surface area of a solid and a solution is in the range of 10% to 90% of the total surface area of the solid. In some embodiments, the contact surface area of a solid and a solution is in the range of 10% to 80% of the total surface area of the solid. In some embodiments, the contact surface area of a solid and a solution is in the range of 10% to 70% of the total surface area of the solid. In some embodiments, the contact surface area of a solid and a solution is in the range of 10% to 60% of the total surface area of the solid. In some embodiments, the contact surface area of a solid and a solution is in the range of 10% to 50% of the total surface area of the solid.

In some embodiments, the fluid flow rate is in the range of 1 ml/min to 200 ml/min. In some embodiments, the fluid flow rate is in the range of 1 ml/min to 100 ml/min. In some embodiments, the fluid flow rate is in the range of 50 ml/min to 200 ml/min. In some embodiments, the fluid flow rate is in the range of 10 ml/min to 70 ml/min. In some embodiments, the fluid flow rate is in the range of 1 ml/min to 50 ml/min. In some embodiments, the fluid flow rate is in the range of 1 ml/min to 40 ml/min. In some embodiments, the fluid flow rate is in the range of 1 ml/min to 30 ml/min. In some embodiments, the fluid flow rate is in the range of 1 ml/min to 20 ml/min.

In some embodiments, the solid comprises a metal hydride. In some embodiments, the solution is an aqueous solution. In some embodiments the solution comprises a catalyst. In some embodiments, the solution comprises sea water. In some embodiments, the solution comprises wastewater. In some embodiments the solution comprises a catalyst. In some embodiments, the solid comprises a catalyst.

According to an aspect of some embodiments of the present invention, there is provided a method for generating hydrogen using a hydrogen production device as described elsewhere herein. In some embodiments, the method comprises providing a solid to the solid compartment of the hydrogen production device. In some embodiments, the method comprises providing an amount of a solution to the solution containing compartment of the hydrogen production device. In some embodiments, the method comprises contacting at least a portion of the solid with a solution thereby dissolving a portion of the solid. In some embodiments, the method comprises transporting the solution containing a portion of the solid to the solution compartment, thereby triggering a chemical reaction as described elsewhere herein resulting in generation of hydrogen. In some embodiments, the initial amount of the solution is the same throughout the process. In some embodiments, the concentration of the by-products of the chemical reaction described elsewhere herein in the solution, increases with time.

In some embodiments, the solid comprises a metal hydride. In some embodiments, the solution is an aqueous solution. In some embodiments, the solution comprises sea water. In some embodiments, the solution comprises wastewater. In some embodiments the solution comprises a catalyst. In some embodiments, no external solution is added to the generator. In some embodiments, the solid comprises a catalyst. In some embodiments, the catalyst is embedded in the system. In some embodiments, the catalyst is fixed within the solution compartment. In some embodiments, the catalyst is fixed within the solid containing compartment. In some embodiments, the catalyst is fixed within the partition.

In some embodiments, the method generates 0.05 g to 2 g of hydrogen per 1 g of $NaBH_4$. In some embodiments, the method generates 0.05 g to 0.5 g of hydrogen per 1 g of $NaBH_4$. In some embodiments, the method generates 0.05 g to 0.3 g of hydrogen per 1 g of $NaBH_4$. In some embodiments, the method generates 0.05 g to 0.25 g of hydrogen per 1 g of $NaBH_4$. In some embodiments, the method generates 0.05 g to 0.2 g of hydrogen per 1 g of $NaBH_4$.

In some embodiments, there is provided a method for controlling hydrogen generation. In some embodiments, controlling comprises stopping the process at any given time. In some embodiments, controlling comprises restarting the process at any given time.

General

As used herein the term "about" refers to ±10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A gas production device comprising:
   a solid compartment configured to contain a solid; and
   a fluid circulation comprising:
      at least one fluid channel with a channel inlet and a channel outlet, said fluid channel comprising a partition along at least a portion of its length, said partition facing said solid compartment such that said partition is in contact with said solid;
      a solution compartment comprising a solution outlet, and configured to contain a solution that produces gas upon contact with said solid and a catalyst, said solution compartment is in fluid connection with said channel outlet; and
      a fluid pathway connected between a said solution outlet and said channel inlet,
   wherein said solution compartment having at least one hydrogen gas outlet, and
   wherein said partition is in contact with an opening in said fluid channel that is configured to receive a fragment of said solid to be mixed with said solution to form a mixture inside said at least one fluid channel, and wherein said at least one fluid channel outlet is configured to deliver said mixture into said solution compartment.

2. The gas production device of claim 1, wherein said gas is hydrogen.

3. The gas production device of claim 1, further comprising a fluid flow driver in fluid communication with said fluid pathway, wherein said fluid flow driver is selected from a pump, a pressure differentiator, and a gravitational apparatus.

4. The gas production device according to claim 3, further comprising a fluid flow rate regulator connected to said fluid flow driver, wherein said regulator is configured to control the rate of hydrogen generation.

5. The gas production device of claim 4, wherein said fluid flow rate regulator is selected from a processor, a valve, a pump, or any combination thereof.

6. The gas production device of claim 5, wherein said processor is configured to perform at least one of: a) calculating one or more of solution resistance, solution level, temperature, flow, and pressure; and b) controlling at least one of temperature, power, flow rate, and pressure.

7. The gas production device of claim 6, wherein said pressure comprises solution compartment pressure, solid containing compartment pressure, fluid pathway pressure, fluid channel pressure, or any combination thereof.

8. The gas production device of claim 5, wherein said processor is configured to control at least one of: flow rate in at least said fluid pathway flow rate in at least said fluid channel, pressure, said regulator, and said actuator.

9. The gas production device of claim 4, wherein said regulator is configured to control the rate of hydrogen generation, wherein the rate of hydrogen generation is in the range of 1 ml/min to 500 l/min.

10. The gas production device of claim 1, wherein said solid compartment comprises an actuator configured to apply pressure on at least a portion of said solid introduced into the solid compartment, urging said solid towards said partition, so that at least a portion of said solid is continuously in contact with at least a portion of said partition.

11. The gas production device of claim 1, wherein said solid comprises a metal hydride.

12. The gas production device of claim 11, wherein said metal hydride comprises at least one borohydride salt of formula M $(BH_4)_n$, wherein M is selected from the group consisting of alkali metal cations, alkaline earth metal cations, aluminum cation, zinc cation, and ammonium cation, and n corresponds to the charge of the selected M cation.

13. The gas production device of claim 12, wherein said metal hydride comprises $NaBH_4$.

14. The gas production device of claim 1, wherein said solution compartment comprises a mixing element.

15. The gas production device of claim 1, further comprising a heating element.

* * * * *